United States Patent [19]

Salee et al.

[11] 4,255,555

[45] Mar. 10, 1981

[54] TRANSESTERIFICATION PROCESS FOR PREPARATION OF LINEAR POLYESTERS

[75] Inventors: Gideon Salee, Williamsville; Jerold C. Rosenfeld, Tonawanda, both of N.Y.

[73] Assignee: Hooker Chemicals & Plastics Corp., Niagara Falls, N.Y.

[21] Appl. No.: 45,461

[22] Filed: Jun. 4, 1979

[51] Int. Cl.$^3$ .............. C08G 63/18; C08G 63/20
[52] U.S. Cl. ................... 528/179; 528/125; 528/126; 528/128; 528/167; 528/169; 528/173; 528/176; 528/184; 528/190; 528/191; 528/193; 528/194; 528/271
[58] Field of Search .......... 528/125, 126, 173, 176, 528/179, 190, 128, 193, 167, 169, 184, 271, 194, 191

[56] References Cited

U.S. PATENT DOCUMENTS

| | | | |
|---|---|---|---|
| 3,160,602 | 12/1965 | Kantor et al. | 528/179 |
| 3,177,179 | 4/1965 | Lee et al. | 260/47 |
| 3,216,970 | 11/1965 | Conix | 528/179 |
| 3,471,441 | 10/1969 | Hindersinn | 528/179 |
| 3,546,165 | 12/1970 | Morgan | 260/47 |
| 3,939,117 | 2/1976 | Ueno | 528/179 |
| 3,956,422 | 5/1976 | Takahashi et al. | 260/873 |

FOREIGN PATENT DOCUMENTS 538696  1/1978  Japan .

OTHER PUBLICATIONS

"Organic Chemistry" T. W. Solomons (1976), pp. 757–758.
"J. Polymer Sci." vol. II (1973), pp. 2537–2545.
"Textbook of Polymer Sci.", F. W. Billmeyer, Jr. (1971), pp. 260–261.
"Condensation Polymer" P. W. Morgan (1965), p. 12.

*Primary Examiner*—Lester L. Lee
*Attorney, Agent, or Firm*—Peter F. Casella; James F. Mudd; David A. Stein

[57] ABSTRACT

An improved transesterification process for preparation of a linear aromatic polyester comprising bisphenol and dicarboxylic acid monomer units terminated with a carboxylic acid ester groups derived from a long chain aliphatic monofunctional alcohol comprises as the improvement partially transesterifying a diaryl ester of the dicarboxylic acid with the alcohol prior to carrying out the transesterification polymerization reaction of said aryl ester and the bisphenol.

17 Claims, No Drawings

TRANSESTERIFICATION PROCESS FOR PREPARATION OF LINEAR POLYESTERS

BACKGROUND OF THE INVENTION

In the copending U.S. Application of J. C. Rosenfeld Ser. No. 045,464 filed of even date with this application there are described linear aromatic polyesters comprising bisphenol and dicarboxylic acid monomer units which terminate in carboxylic acid ester groups derived from a long chain ($C_8$–$C_{45}$) aliphatic monohydric alcohol, e.g. stearyl alcohol. These polyesters are characterized by enhanced hydrolytic stability compared to corresponding polyesters having conventional substituents terminating the polyester chain (such as —OH, COOH, —COOR where R is, for example, an aryl group, e.g. phenyl).

According to the aforementioned copending application, the linear aromatic polyesters can be prepared by carrying out transesterification polymerization of a mixture of a diaryl ester of a dicarboxylic acid, a bisphenol and a minor molar proportion (based on the diaryl ester reactant) of a $C_8$–$C_{45}$ aliphatic monohydroxy alcohol to provide the aforementioned terminal or end cap substituents in the polyester product. In the aforementioned reaction a monohydroxy aryl compound is displaced from the diaryl ester by the bisphenol and is distilled from the polymerization mass. According to a preferred embodiment of the aforementioned process duration of heating of the polymerization reaction mass is curtailed to avoid a decomposition side reaction of the long chain alkyl-carboxylate terminated polyester (resulting in loss of the long chain alkyl substituent, e.g. a stearyl group, via formation of olefin e.g. 1-octadecene) which side reaction results in loss of the desired long chain alkyl ester termination in the polyester product.

It is now found that in the aforementioned preparatory process, involving the simultaneous transesterification reaction of the diaryl dicarboxylic acid ester, the bisphenol and the long chain aliphatic alcohol a substantial loss of the long chain alcohol from the preparatory reaction mass occurs due to entrainment of the alcohol with the aromatic monohydroxy compound which distills from the reaction mass, i.e. a substantial quantity of the alcohol reactant is lost as distillate without reacting to form the desired alkyl carboxylate end cap substituents of the polyester.

The loss of long chain alcohol from the reaction mass results in a polyester product having a relatively low percentage of the desired long chain alkyl end cap substituents. While this loss can be overcome by providing efficient fractionation of the distillation overhead stream containing the monohydroxy aromatic compound and the long chain alcohol, efficient fractional distillation requires costly equipment and is necessarily very time consuming. Charging of an excess of the alcohol to compensate for the loss of alcohol is not desirable since the alcohol is costly and use of such excess may deleteriously lower the molecular weight of the product. Separation and recycling of the alcohol from the distillate to the reaction mass to overcome the aforementioned loss is both inconvenient and costly.

It is the object of the present invention to devise an efficient improved process of preparing the present polyesters which substantially diminishes the loss of the long chain alcoholic reactant via entrainment with the monohydroxy aromatic compound side product evolved in the transesterification polymerization.

SUMMARY OF THE INVENTION

The present invention is directed to an improvement in the process of preparing a linear aromatic polyester by the transesterification polymerization reaction of a mixture of a bisphenol and a diaryl ester of a dicarboxylic acid wherein the molar proportion of the bisphenol and the diaryl ester ranges from about 5 molar percent insufficiency of the diaryl ester over the stoichiometric equivalent proportion of the bisphenol and the diaryl ester to a stoichiometric excess of the diaryl ester over the bisphenol reactant. According to this improvement the diaryl ester is transesterified with a minor molar proportion of a saturated aliphatic hydrocarbon monofunctional alcohol of 8 to 45 carbon atoms prior to any reaction of the bisphenol reactant and the diaryl ester reactant, said proportion of the alcohol being based on the molar amount of the diaryl ester reactant employed in the polymerization reactant.

By use of the present process improvement step, the loss of long chain aliphatic alcohol via entrainment to the distillate of the polymerization reaction mass is diminished from more than about 10 weight percent of the alcohol charged to about 0.3 weight percent of the alcohol charged.

According to the invention prereaction of the alcohol with the diaryl ester reactant prior to any transesterification polymerization reaction involving the bisphenol reactant does not have any deleterious effect on the transesterification polymerization reaction or upon the properties of the polyester product.

DETAILED DESCRIPTION OF THE INVENTION AND PREFERRED EMBODIMENTS THEREOF

REACTANTS

Dicarboxylic Acid (Aryl Ester) Reactant

The diaryl esters of the dicarboxylic acid employed as reactants in the present transesterification reaction are, in general, di-esters of the dicarboxylic acid and a monohydroxy aromatic compound of the benzene or naphthalene series containing 6 to 20 carbon atoms, such as phenol, o, m or p-cresol, xylenol, a halophenol such as p-chlorophenol, 3,5-dibromophenol, a nitro phenol such as o-, m- or p-nitrophenol, 1-naphthol, 2-naphthol, 1-hydroxy-4-methyl naphthalene and the like. Preferably the ester reactant is a derivative of a monohydroxy aromatic hydrocarbon, especially a monohydroxy aromatic hydrocarbon of the benzene series, and especially is phenol itself. While the ester groups of the dicarboxylic acid di-ester reactant may be derived from different monohydroxy aromatic compounds, preferably both ester groups of the diester reactant are derived from the same monohydroxy aromatic compounds.

The dicarboxylic acid employed in the diester reactant are also well known and can be represented by the formula:

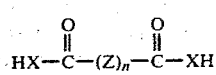

in which X is oxygen or sulfur, Z is alkylene, -Ar- or Ar-Y-Ar- (where Ar has the same definition as that given below with respect to the bisphenols), Y is an alkylene group of 1 to 10 carbons, haloalkylene, $$-O-, -S-, -SO-, -SO_2-, -SO_3-, -CO-,$$

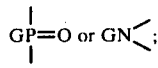

(where G has the same definition as that given below with respect to the bisphenols), and n is 0 or 1.

Suitable dicarboxylic acid include aromatic dicarboxylic acids such as phthalic acid, isophthalic acid, terephthalic acid, as well as the other aromatic dicarboxylic acids illustrated in G. Salee, U.S. Pat. No. 4,126,602 (issued Nov. 21, 1978) at column 4, lines 5-17, the subject matter of said patent being incorporated herein by reference.

Suitable aliphatic dicarboxylic acids include oxalic acid, malonic acid, 1,3-dithionmalonic acid, as well as the other aliphatic dicarboxylic acids illustrated in the aforementioned U.S. Pat. No. 4,126,602 of G. Salee at column 4, lines 17-19. Diesters of aromatic dicarboxylic acid and especially of isophthalic acid and terephthalic acid are preferred due to their availability and low cost. Most preferably, the dicarboxylic acid ester reactant comprises a mixture of about 75 to about 100 mol percent of an isophthalic acid diester and about 25 to about 0 mole percent of a terephthalic acid diester.

When the dicarboxylic acid diesters used in preparing a polyester of the invention consist of both isophthalic and terephthalic acid diesters in accordance with an especially preferred embodiment of the invention, a weight proportion of isophthalic to terephthalic acid residues in the diester reactant ranging from about 75:25 to about 90:10 provides an especially satisfactory result.

BISPHENOL REACTANT

The bisphenols which can be used in this process are known in the art and correspond to the general formula:

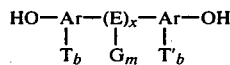

wherein Ar is aromatic, desirably a hydrocarbon aromatic group, preferably containing 6-18 carbon atoms (including phenyl, biphenyl and napthyl); G is alkyl, haloalkyl, aryl, haloaryl, alkylaryl, haloalkylaryl, arylalkyl, haloarylalkyl, cycloalkyl, or halocycloalkyl; E is a divalent (or di-substituted) alkylene, haloalkylene, cycloalkylene, halocycloalkylene, arylene, or haloarylene, —O—, —S—, —SO—, —SO$_2$—,

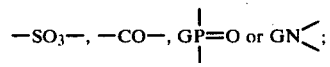

T and T' are independently selected from the group consisting of halogen, such as chlorine or bromine, G and OG; m is an integer from 0 to the number of replaceable hydrogen atoms on E; b is an integer from 0 to the number of replaceable hydrogen atoms on Ar, and x is 0 or 1. When there is plurality of G substituents in the bisphenols, such substituents may be the same or different. The T and T' substituents may occur in the ortho, meta or para-positions with respect to the hydroxyl radical. The foregoing hydrocarbon radicals preferably have carbon atoms as follows: alkyl, haloalkyl, alkylene and haloalkylene of 1 to 14 carbons; aryl, haloaryl, arylene and haloarylene of 6 to 14 carbons; alkylaryl, haloalkylaryl, arylalkyl and haloarylalkyl of 7 to 14 carbons; and cycloalkyl, halocycloalkyl, cycloalkylene and halocycloalkylene of 4 to 14 carbons. Additionally, mixtures of the above described bisphenols may be employed to obtain a polymer with especially desired properties. The bisphenols generally contain 12 to about 30 carbon atoms, and preferably 12 to about 25 carbon atoms.

Typical examples of bisphenols having the foregoing formula include bis-(3-hydroxyphenyl)-1,2-ethane, bis-(4-hydroxyphenyl)-1,2-ethane as well as the other bisphenols illustrated in the aforementioned U.S. Pat. No. 4,126,602 of G. Salee at column 2, line 68 to column 3, line 47.

Representative biphenols having the foregoing formula are p,p'-biphenol and the other biphenols illustrated in the aforementioned U.S. Pat. No. 4,126,602 of G. Salee at column 3, lines 47-55. Mixtures of isomers of the foregoing bisphenols and biphenols can be used.

OPTIONAL ALIPHATIC GLYCOL MODIFIER REACTANTS

While the present invention is preferably directed to transesterification polymerization preparation of polyesters derived exclusively from a dihydroxy aromatic compound i.e. a bisphenol or biphenol, as described hereinabove, it is also within the scope of the invention to prepare polyesters containing a minor molar proportion of monomer residues (based on the bisphenol monomer residue) of a difunctional aliphatic glycol of 2 to 100 carbon atoms, preferably of 2 to 20 carbon atoms, i.e. the type of polyester taught by British Pat. No. 924,697 to Imperial Chemicals Industries, issued Apr. 24, 1963 (see page 3, lines 12-26), F. Blascke et al., U.S. Pat. No. 3,399,170 issued Aug. 27, 1968 (see Col. 2, lines 14-16) and A. L. Lemper et al., U.S. Pat. No. 4,137,278 issued Jan. 30, 1979. The subject matter of these patents is incorporated herein by reference. Typical examples of suitable alkylene glycols include ethylene glycol and the other difunctional modifiers illustrated in the aforementioned U.S. Pat. No. 4,126,602 of G. Salee at column 4, lines 55-66. Further illustrative examples of suitable glycols are given in the aforementioned U.S. Pat. No. 4,137,278 of A. L. Lemper et al.

Preferably an aliphatic glycol is employed, especially an aliphatic glycol wherein the two hydroxy groups are primary hydroxy substituents.

MONOFUNCTIONAL ALCOHOL REACTANT

The long chain aliphatic monohydroxy alcohol reactant employed in the invention provides terminal long chain alkyl carboxylate ester substituents in the polyester corresponding to the formula —COOR wherein R represents the organic residue of the monfunctional aliphatic alcohol.

The aliphatic residue present in the monohydroxy aliphatic alcohol reactant of the invention (and in the terminal carboxylate ester group of the present polyester product) is generally saturated, i.e. is devoid of ethylenic or acetylenic unsaturation. The organic residue of the alcohol may contain aromatic substituents such as phenyl substituents, and aliphatic ether substituents, e.g.

straight and branched chain lower alkoxy groups (wherein "lower" indicates an alkyl group of 1 to 6 carbon atoms) in addition to hydrogen substituents, but is devoid of substituents, e.g. hydroxy groups, which are capable of undergoing esterification in the esterification polymerization reaction employed to prepare the present polyesters.

Preferably the organic residue of the alcohol reactant contains in addition to carbon to carbon bonds only carbon to hydrogen bonds i.e. the organic residue is preferably a hydrocarbon residue. The organic residue of the alcohol reactant may be cyclic but, preferably is an acylic aliphatic residue. If acyclic, the organic residue of the alcohol may be a straight chain or branched chain alkyl group. Preferably the organic residue of the monohydroxy alcohol reactant is a straight chain aliphatic residue.

The hydroxy group of the monohydroxy alcohol reactant may be a primary, secondary or tertiary hydroxy group. Preferably a monohydroxy aliphatic alcohol reactant having a primary hydroxy substituent is employed.

The monohydroxy aliphatic alcohol reactant contains from 8 to 45 carbon atoms preferably from 9 to 40 carbon atoms. More preferably the aliphatic alcohol contains 12 to 30 carbon atoms, especially 15 to 20 carbon atoms.

The monohydroxy aliphatic alcohols employed as end-capping reagents in accordance with the invention are illustrated by the following representative examples:
n-octyl alcohol
c-octyl alcohol

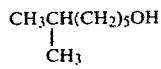

n-methyl benzyl alcohol
$(CH_3)_2C(CH_2)_{12}OH$
$CH_3(CH_2)_{11}C(CH_3)_2OH$
$CH_3(CH_2)_{12}CH(CH_3)_2OH$
$CH_3O(CH_2)_{12}OH$
$CH_3(CH_2)_{14}OH$
n-nonyl alcohol
n-decyl alcohol
n-undecyl alcohol
n-dodecanol
n-pentadecanol
stearyl alcohol
n-eicosanol
$CH_3(CH_2)_{44}OH$
$CH_3(CH_2)_{29}OH$, i.e. n-tricontanol

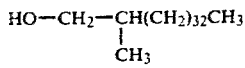

$CH_3(CH_2)_{39}OH$, i.e. n-tetracontanol

Mixtures of these and equivalent monohydroxy aliphatic alcohols can also be employed in the practice of the invention.

DETAILED DESCRIPTION OF TRANSESTERIFICATION PROCEDURE

In the conventional preparation of bisphenol-dicarboxylic acid linear aromatic polyesters by a transesterification i.e. melt, polymerization reaction, a mixture of the bisphenol and a dicarboxylic acid diaryl ester is heated, desirably under a substantially anhydrous inert atmosphere, e.g. of dry nitrogen, to a sufficient elevated temperature, generally above about 100°, to liquify the reactants, i.e. provide a molten reaction mass. Generally the reaction mass also contains an ester-interchange or transesterification catalyst of the type described herein below. In the ensuing transesterification polymerization reaction which may be accelerated by raising the reaction mass temperature to about 350° C. the aryl group of the diaryl ester is displaced by the bisphenol to form a monohydroxy aromatic compound, e.g. a phenol. The reaction pressure is normally diminished during the reaction, e.g. from atmospheric pressure to a subatmospheric pressure of about 0.1 mm of mercury or lower. In carrying out the reaction, provision is generally made for distillative removal of the mono-hydroxy aromatic compound to drive the reversible transesterification process to completion.

It is often desirable to carry out the transesterification preparation of the polyester in two stages, for example a low temperature or prepolymerization stage wherein the bisphenol and diaryl ester are transesterified at a temperature of from above about 100° to about 300° C., preferably at about 175° to about 300° C. and especially at about 175° to about 250° C. under the aforementioned conditions of reaction pressure to prepare a low molecular weight bisphenol-dicarboxylic acid polyester (which may conveniently be termed a polyester prepolymer) having a relatively low intrinsic viscosity e.g. of the order of about 0.1 to less than about 0.2 dl/g. The prepolymer is then conveniently heated at a somewhat higher reaction temperature, e.g. at about 150° to about 350° C., preferably at about 225° to about 350° C. and especially at about 250° to about 330° C. under the aforementioned condition of reaction pressure to complete the polymerization reaction. The latter reaction stage is conveniently designated the polymerization stage and, if desired, the latter stage can be carried out in a different reaction vessel from that employed to prepare the polyester prepolymer.

The ester-interchange catalysts conventionally employed in the foregoing melt or transesterification polymerization preparation of linear aromatic bisphenol-polyesters include magnesium oxide, lead oxide, zinc oxide, antimony trioxide and alkoxides formed by reacting the alkali or alkaline earth metals, aluminum or titanium with an alcohol or a glycol, e.g. aluminum isopropoxide. Other suitable ester-interchange catalysts employed in the prior art include organic esters derived from ortho titanic acid, metal hydroxides such as lithium hydride and potassium borohydride, and alkali metal salts of dihydroxy-diaryl-alkanes such as the sodium salt of the bisphenol reactant employed in the polymerization.

The proportion of the aforementioned transesterification catalysts conventionally employed in preparing linear aromatic polyesters of bisphenols and dicarboxylic acids via transesterification is generally a catalytically effective amount, for example about 0.005 to about 2%, preferably about 0.01 to 1% by weight based on the combined weight of the weight of the bisphenol reactant and the dicarboxylic acid diaryl ester reactant. Further illustrations of suitable transesterification catalysts and suitable proportions thereof are given in the aforementioned British Pat. No. 924,697. The latter patent and aforementioned U.S. Pat. Nos. 3,399,170 and 4,137,278 illustrate the conventional preparation by transesterification polymerization of polyesters comprising bisphenol and dicarboxylic acid residues.

The aforementioned type of two stage transesterification polymerization technique for preparing linear aromatic polyesters is described in G. Bier, Polymer 15 527–535 (1974) and in K. Eise, German Prelim. Application No. 2,232,877 (the subject matter of which references is incorporated herein by reference.

As alluded to above the aforementioned U.S. Application Ser. No. 045,464 of J. C. Rosenfeld, discloses linear aromatic bisphenol polyesters terminated with long chain alkyl carboxylic acid ester groups which are prepared via a transesterification reaction by simultaneous reaction of the bisphenol, the diaryl ester and the long chain alcohol reactant of the present process. The latter application disclose polyesters containing at least about 5 mole percent of the long chain alkylcarboxylate ester end groups based on the total number of end groups in the polyester (corresponding to at least about 0.25 weight percent of the alkyl carboxylate ester end group based on the weight of the polyester). Polyesters containing more than about 2 weight percent of the alkyl carboxylate ester end group are disclosed in the latter application as having enhanced hydrolytic stability. In accordance with the latter application a bisphenol dicarboxylic acid polyester containing the present $C_8$–$C_{45}$ alkyl carboxylate ester end group is obtained by charging the long chain aliphatic alcohol reactant in a minor molar proportion i.e. at least about 0.1 mole percent, based on the molar amount of the dicarboxylic acid diaryl ester reactant employed. Preferably a proportion of the alcohol reactant in the range of from above about 2.5 to about 25 mole percent, more preferably about 3.0 to about 10 mole percent and especially about 3.5 to about 8 mole percent of the alcohol is used based on the molar proportion of the diaryl ester reactant.

Additionally the proportion of diaryl ester and bisphenol is such as to provide at least some carboxylic acid ester residue termination in the product polyester, (i.e. to provide a polyester in which the terminal residues of the polyester comprise a monomer residue of the dicarboxylic acid aryl ester reactant). As is known, carboxylate group termination in linear aromatic polyesters comprising bisphenol and dicarboxylic mononer residues results from use of a molar proportion of the dicarboxylic acid reactant ranging from a stoichiometric excess of the dicarboxylic acid reactant (over the molar amount of bisphenol and any difunctional aliphatic glycol reactant employed) to a slight stoichiometric insufficiency of the dicarboxylic acid reactant corresponding to about a 5 mole percent stoichiometric excess of bisphenol and any difunctional aliphatic glycol reactant. Preferably, the polyesters of the invention are prepared employing a molar amount of the dicarboxylic acid diester reactant which is about equivalent stoichiometrically to the molar amount of bisphenol and any difunctional aliphatic glycol reactant employed.

As described in the aforementioned U.S. Application Ser. No. 045,464 the other conditions of the transesterification reaction for example the type and proportion of transesterification catalyst, and the reaction temperature and pressure conditions are substantially the same as are used in conventional transesterification preparation of conventional linear aromatic polyesters.

In the practice of the present invention the long chain aliphatic alcohol reactant is mixed with the diaryl ester reactant and the mixture is transesterified with the transesterification reaction being allowed to proceed substantially to completion before the addition of the bisphenol reactant and reaction thereof to form the product polyester. When a difunctional glycol reactant is employed in the preparation of the polyester, the glycol reactant may be added with the monofunctional alcohol, or subsequent to the addition of the alcohol, i.e. either prior to, or simultaneously with, the addition of the bisphenol reactant.

The transesterification prereaction of the diaryl ester and the monohydroxy aliphatic alcohol in accordance with the invention is generally carried out at a temperature of about 100° to about 300° C. preferably at about 150° to about 250° C. and especially at about 175° to about 225° C. The reaction pressure in the prereaction step of the invention can be atmospheric but preferably is a subatmospheric pressure, for example a subatmospheric pressure in the range of about 750 mm of mercury to about 0.1 mm of mercury.

The present prereaction step is carried out with substantially the same catalysts, proportions of catalysts and proportions of reactants as are employed in the aforementioned U.S. Application of J. C. Rosenfeld Ser. No. 045,464 the subject matter of which is incorporated herein by reference.

When, as is desirable, the prereaction step of the invention is carried out with overhead, i.e. distillative, removal of the monohydroxy aromatic compound as in transesterification polymerization of the aforementioned U.S. Application of J. C. Rosenfeld Ser. No. 045,464, it was unexpectedly discovered that only a negligible amount of the alcohol was entrained and delivered to the said distillate during the prereaction step. Moreover, the proportion of the long chain alcohol collected in the distillate during the entire polymerization reaction of the present process is only about 0.3 to 0.6% based on the weight of alcohol charged. In contrast (as is evident from a comparison of the results of Examples 2, 3, and 4 with those of Control Example 1), the loss of the alcohol to the distillate in the simultaneous reaction of the bisphenol, the diaryl ester, and the alcohol is about 10.3% based on the weight of alcohol charged indicating that the present process improvement prevents entrainment of the alcohol in a substantially quantitative fashion.

As is disclosed in the aforementioned application of J. C. Rosenfeld Ser. No. 045,464 a curtailment of the duration of heating the polymerization reaction mass in the polymerization stage of the polymerization reaction is also effective in diminishing a loss of long chain alkyl carboxylate-terminated polyester product via a side reaction decomposition i.e. pyrolysis side reacting of said end groups of olefin. By preferably employing both curtailment of duration of heating as described in the aforementioned U.S. Application of J. C. Rosenfeld Ser. No. 045,464 as well as the prereaction step of this invention in the preparation of the polyester by transesterification, a maximum in the yield of the desired long chain alkyl carboxylate ester-terminated polyester is realized i.e. a maximum in the molar conversion of the long chain alcohol reactant to the desired ester end group is realized.

PRODUCTS OF THE INVENTION

The present invention provides linear aromatic polyesters containing as terminal groups long chain alkyl carboxylic acid substituents which are substantially equivalent in their structural groups to the corresponding polyesters prepared by transesterification polymerization without prereaction in the aforementioned U.S. Application of J. C. Rosenfeld Ser. No. 045,464. These products are distinctive from the fluoroalkyl endcapped polyesters of bisphenol and dicarboxylic acids disclosed in G. Salee and J. C. Rosenfeld U.S. Application Ser. No. 045,464, filed of even date with the present application, since the present products are devoid of fluorine-substitution in the terminal alkyl group.

Since, in accordance with the present invention, the alcohol reactant is substantially retained in the polymerization reaction mixture, the alcohol reactant is efficiently converted to the aforementioned long chain alkyl carboxylic acid ester terminal substituents without the necessity to employ costly, time-consuming fractional distillation of the monohydroxy aromatic compound overhead stream, a costly inconvenient separation of the alcohol from monohydroxy aromatic compound distillate with recycling of the recovered alcohol to the polymerization reaction mass, or the undesirable costly use of an excess of monohydroxy alcohol to compensate for alcohol lost by entrainment (which excess proportion of alcohol may undesirably limit the molecular weight of the polyester product).

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

EXAMPLE 1 (Control)

Bisphenol-A (1084.9 g., 4.75 moles) diphenyl isophthalate (1146 g., 3.60 moles) diphenyl terephthalate (382 g., 1.20 moles) and stearyl alcohol (25.47 g., 0.096 mole corresponding to 2 mole percent based on total molar quantity of the diphenyl ester reactants) are each dried for about 16 hours at 70° in a vacuum oven and charged to five liter reaction vessel under dry nitrogen. The mixture is heated with agitation over a period of 1.2 hours to about 173° to form a molten mass. About 4.8 cc. of a solution of lithium phenoxide in dry tetrahydrofuran (which is prepared by dissolving metallic lithium in phenol in dry tetrahydrofuran and which contains about 0.3 g., 0.003 mole of lithium phenoxide) is charged as transesterification catalyst to the molten mass. Over a period of about 1.5 hours the reaction mixture temperature is gradually raised to 215° and the reaction mixture pressure is diminished from atmospheric pressure to a pressure of about 0.1 mm. of mercury as phenol which is displaced from the diphenyl ester reactants distilled from the reaction mixture. The phenolic distillate is condensed, cooled to ambient temperature and reserved for analysis as described below. After about 90% of the theoretical amount of phenol expected from the polymerization has been collected, the reaction mass which consists essentially of a low molecular weight bisphenol-isophthalate-terephthalate polyester, i.e. a polyester prepolymer, is cooled to ambient temperature. The intrinsic viscosity of the prepolymer mass which is a light yellow brittle solid is about 0.14 dl/g. (as determined at 30° from a 0.5% solution of the prepolymer product in symmetrical tetrachloroethane) corresponding to a weight average molecular weight of about 7000. The number average molecular weight of the prepolymer is about 3500.

About 1500 g. of the aforementioned prepolymer product are pulverized and dried for about 16 hours in a vacuum oven and charged to a 2 gallon oil bath heated reaction vessel under a blanket of dry nitrogen gas to complete the polymerization reaction. Over a period of 1.5 hours the reaction mass is heated with agitation to a temperature of 290° while the reaction mixture pressure is decreased from atmospheric pressure to a pressure of about 0.55 mm. of mercury and the phenol which is displaced in the reaction is distilled from the reaction mixture and collected as previously described. The polymerization reaction is continued for an additional 6.5 hours at a temperature of about 290°–300° and a diminished pressure of about 0.6 to 0.7 mm. of mercury. Upon completion of the reaction, the reaction vessel is gradually flooded with dry nitrogen gas at atmospheric pressure and the product polymer is recovered and allowed to cool to ambient temperature.

There is recovered about 1316.9 g. of a bisphenol-isophthalate-terephthalate polyester wherein the molar ratio of isophthalic acid monomer residues to terephthalic acid monomer residues is about 75:25. The product contains about a stoichiometric molar equivalent proportion of hydroxy end groups and carboxylate ester end groups. The carboxylate end groups of the polyester consist of phenyl carboxylate ester end groups of the formula $C_6H_5OCO-$, (which are conventional substituents in bisphenol-dicarboxylic acid polyester prepared by the transesterification polymerization reaction of a bisphenol and a dicarboxylic acid diphenyl ester) and stearyl carboxylate ester end groups of the formula $n-C_{18}H_{37}OCO-$. About 25 mole percent of the total end groups (i.e. $-OH$, $C_6H_5OCO-$, and $n-C_{18}H_{37}OCO-$ end groups) are stearyl carboxylate ester end groups.

The product polyester is a clear yellow, mechanically resilient resin having an intrinsic viscosity of 0.56 dl/g., determined as previously described and a corresponding weight average molecular weight of about 26,000. The number average molecular weight of the product is about 12,000. The stearyl carboxylate ester end group constitutes about 1.18% by weight of the weight of the polyester.

On injection molding in an Arburg 211E/150 injection molding apparatus, the product polyester exhibits excellent processability similar to that of a comparable conventional bisphenol-isophthalate-terephthalate polyester prepared by transesterification.

The phenolic distillates obtained during the aforementioned preparation of the prepolymer and in the subsequent polymerization reaction are separately analyzed quantitatively by gas liquid chromatography. In addition to phenol, the phenolic distillate of the prepolymer preparatory reaction contains 2.52 g. corresponding to 9.7 mole percent of the stearyl alcohol charged. In addition to phenol, the phenolic distillate recovered in the polymerization reaction contains 0.15 g. of stearyl alcohol corresponding to 0.6 mole percent of the stearyl alcohol charged. The total loss of unreacted stearyl alcohol overhead in the reaction is thus about 10.3 mole percent (or weight percent) of the stearyl alcohol charged.

In addition to stearyl alcohol values the phenolic distillate recovered in the polymerization reaction also contains 4.83 g. of 1-octadecene (formed by decomposition of the stearyl carboxylate ester end groups in the product). No octadecene is detected in the phenolic distillate recovered from the prepolymer preparatory reaction. The amount of 1-octadecene in the phenolic distillate of the polymerization reaction indicates an additional loss of about 18.6 mole percent of stearyl ester end groups (computed as a loss of the stearyl alcohol charged) via decomposition of said ester end groups to 1-octadecene. The total mole percent loss is stearyl carboxylate ester end groups from the product based on stearyl alcohol charged, (computed as the sum of moles of stearyl alcohol lost by entrainment and moles of stearyl alcohol corresponding to 1-octadecene, based on stearyl alcohol charged) is 28.9% corresponding to a molar conversion of stearyl alcohol to stearyl ester product end groups of about 71.1%. The results of this Example are presented in the Table below.

EXAMPLE 2

The procedure of Example 1 is repeated substantially as described except that a mixture of the diphenyl isophthalate (1146 g., 3.60 mole), the diphenyl terephthalate (382 g., 1.20 moles) and the stearyl alcohol (28.57 g., 0.106 mole corresponding to 2.2 mole percent based on the total molar quantity of the diphenyl ester reactants) comparable to that in Example 1 is transesterified in the presence of the catalyst of Example 1 prior to addition of the bisphenol-A reactant (1084 g., 4.75 moles). Thus, a mixture of diphenyl isophthalate, diphenyl terephthalate and stearyl alcohol is charged under dry nitrogen gas to the five liter reaction vessel of Example 1 and melted by heat with agitation to 170°. After addition of the Example 1 catalyst, the temperature of the reaction mixture is gradually raised to 204°–209° and the reaction pressure is diminished from atmospheric pressure to about 0.18 mm. to 0.35 mm. of mercury. The reaction mass is then agitated at the latter conditions of temperature and pressure while phenol which is displaced by the transesterification reaction of the stearyl alcohol with the diphenyl ester reactants is removed overhead, condensed and collected as in Example 1. After about 17 minutes, the latter transesterification reaction is substantially complete (as indicated by cessation of distillation of phenol overhead from the reaction mixture). About 7.9 g. of phenolic distillate are recovered during the reaction of the diphenyl esters and the stearyl alcohol. The reaction mixture is returned to atmospheric pressure by flooding with dry nitrogen according to the procedure in Example 1 and the bisphenol A reactant of Example 1 is added to the reaction mixture. The reaction mixture is heated to a temperature of about 220° while the reaction mixture pressure is gradually lowered to about 0.2 mm. of mercury and maintained at the latter conditions of temperature and pressure to prepare the polyester prepolymer. About 808 g. of phenolic distillate are collected during the formation of the polyester prepolymer. About 1703 g. of prepolymer, similar to that obtained in Example 1, are recovered in accordance with the procedure of Example 1. The intrinsic viscosity of the prepolymer is 0.15 dl/g. determined as described in Example 1 (corresponding to a weight average molecular weight of about 7000). The number average molecular weight of the prepolymer is about 3500.

The procedure employed in the final polymerization stage is substantially as described in Example 1 except that the polymerization reaction mixture is maintained at about 290°–300° under a diminished pressure of about 0.6 to about 0.7 mm. of mercury for about 9 hours instead of 6.5 hours as in Example 1.

The product resin (1301.6 g.) which is recovered substantially as in Example 1 is a clear yellow mechanically resilient bisphenol-isophthalate-terephthalate containing about the same molar proportions of monomer residues and end groups as that of Example 1. The intrinsic viscosity of the product is about 0.57 dl/g. determined as previously described corresponding to a weight average molecular weight of 28,000. The number average molecular weight of the product is about 12,800. The product polyester contains about 23.8 mole percent stearyl carboxylate end groups based on the total end groups in the polyester.

On injection molding in an Arburg 211E/150 injection molding apparatus, the product polyester exhibits excellent processability substantially similar to that of the product in Example 1.

The phenolic distillates obtained during transesterification reaction of the stearyl alcohol with the diphenyl ester reactants, during the preparation of the polyester prepolymer and during the subsequent polymerization stage, are analyzed by gas liquid chromatography as described in Example 1 for unreacted stearyl alcohol and for 1-octadecene.

The phenolic distillate obtained during the transesterification reaction of stearyl alcohol and the diphenyl ester reactants contains 0.0014 g. of stearyl alcohol (corresponding to a loss of stearyl alcohol based on stearyl alcohol charged of 0.005 mole percent).

The phenolic distillate obtained during the polyester prepolymer preparation reaction contains substantially no stearyl alcohol.

The phenolic distillate obtained during the final polymerization stage contained 0.0823 g. of stearyl alcohol (corresponding to a loss of stearyl alcohol based on stearyl alcohol charged of 0.29 mole percent).

The phenolic distillate obtained during the reaction of stearyl alcohol with the diphenyl esters and the phenolic distillate obtained during prepolymer formation are combined for the analysis for 1-octadecene. The amount of 1-octadecene in this combined distillate is 0.0029 g. (corresponding to a mole percent loss of product stearyl carboxylate end groups as 1-octadecene, based on stearyl alcohol charged, of 0.01%).

The phenolic distillate obtained in the final polymerization reaction (corresponds to a mole percent loss of product stearyl carboxylate ester end groups as 1-octadecene, based on stearyl alcohol charged of 35.8%.

These results are compared with the corresponding results of Example 1 in the Table below.

EXAMPLE 3

The following Example illustrates the use of technology of this invention, i.e. transesterification of the diaryl ester with monofunctional aliphatic alcohol prior to the polymerization reaction of the diaryl ester and the bisphenol, conjointly with the improved preparatory technique of J. Rosenfeld, U.S. Application Ser. No. 045,464 which is directed to diminished duration of heating of the polymerization mass. Use of both techniques together in a preparatory process achieves a maximum in the conversion of the long chain alcohol reactant to the desired long chain alkyl carboxylate terminal ester groups in the polyester product.

The procedure of Example 2 is repeated substantially as described except that a mixture of diphenyl isophthalate (1146 g., 3.60 moles) diphenyl terephthalate (382 g., 1.2 moles) and stearyl alcohol (45.93 g., 0.1698 mole corresponding to 3.54 mole percent of the total molar quantity of the diphenyl ester reactants) is transesterified in the presence of the catalyst prior to addition of the bisphenol (1076 g. 4.72 moles) and the term of heating of the polymerization mass at the polymerization temperature of about 290°-302° is reduced from about 9 hours to about 4 hours employing a diminished pressure, 0.95 mm to 1.55 mm. of mercury, comparable to that employed in Example 2.

The reaction of the stearyl alcohol and the diphenyl isophthalate and terephthalate is carried out for about 20 minutes under conditions comparable to those of the corresponding reaction in Example 2, namely at a temperature of about 196°-204° with the reaction pressure being gradually diminished from atmospheric pressure to a subatmospheric pressure of about 0.13 mm. of mercury.

The subsequent preparation of the polyester prepolymer (having an intrinsic viscosity of about 0.36 dl/g) is carried out for 45 minutes at conditions comparable to those employed in Example 2, namely at a temperature of about 181° to 215° with the reaction pressure being gradually diminished from atmospheric pressure to a subatmospheric pressure of about 0.18 mm. of mercury.

There is obtained an excellent polyester product (1196.8 g.) having an intrinsic viscosity of about 0.36 dl/g. determined as previously described corresponding to a weight average molecular weight of about 15,000. The number average molecular weight of the polyester product is about 6,940.

The proportion of difunctional monomer residues in the product is substantially the same as in the product of Example 2. The product contains about 29.3 mole percent stearyl oxy carbonyl ester, i.e. stearyl carboxylate ester, end groups based on the total end groups in the polyester.

The phenolic distillate recovered during the reaction of the stearyl alcohol and the diphenyl ester reactants prior to addition of the bisphenol A, the phenolic distillate obtained during preparation of the prepolymer, and the phenolic distillate obtained during the final polymerization stage are analyzed for stearyl alcohol and 1-octadecene. The mole percent loss of stearyl groups as unreacted stearyl alcohol and as 1-octadecene are determined as in the preceding Examples. These results are compared with the corresponding results in Examples 1 and 2 in the Table below.

EXAMPLE 4

The following Example, like the preceeding Example 3, illustrates the use of technology of this invention conjointly with the improved preparatory technique of J. Rosenfeld U.S. Application Ser. No. 045,464.

In this Example the procedure of Example 2 is repeated substantially as described except that a mixture of diphenyl isophthalate (1146 g., 3.6 moles), diphenyl terephthalate (382 g., 1.2 moles) and stearyl alcohol (37.3 g., 0.138 mole corresponding to 2.87 mole percent of the total molar quantity of the diphenyl ester reactants) is transesterified in the presence of the catalyst prior to addition of the bisphenol (1080 g., 4.73 mole) and the term of heating of the polymerization mass at the polymerization mass at the polymerization temperature of about 291°-299° is reduced from about 9 hours to about 2 hours employing a diminished pressure, about 0.55 mm. to about 2.05 mm. of mercury, comparable to that in Example 2.

The reaction of the stearyl alcohol and the diphenyl isophthalate and terephthalate is carried out for about 25 minutes under conditions comparable to those of the corresponding reaction in Example 2 namely at a temperature of about 185°-202° with the reaction pressure being gradually diminished from atmospheric pressure to a substmospheric pressure of about 55 mm. of mercury.

The subsequent preparation of the polyester prepolymer (having an intrinsic viscosity of 0.158 dl/g.) is also carried out for 85 minutes at conditions comparable to those employed in Example 2, namely at a temperature of about 168°-225° with the reaction pressure being gradually diminished from atmospheric pressure to a subatmospheric pressure of about 0.5 mm. of mercury.

There is obtained an excellent yield of polyester product having an intrinsic viscosity of about 0.45 dl/g. determined as previously described, corresponding to a weight average molecular weight of about 18,000. The number average molecular weight of the product is about 8,585.

The proportion of difunctional monomer residues in the product is substantially the same as in the product of Example 2. The product contains about 29.3 mole percent stearyl carboxylate ester end groups based on the total end groups in the polyester.

The results of this Example are also compared with corresponding results of the previous Examples in the Table below.

TABLE

| | EXAMPLE 1 (Control) | EXAMPLE 2 | EXAMPLE 3 | EXAMPLE 4 |
|---|---|---|---|---|
| Intrinsic Viscosity of Product (dl/g.); (Weight Average Molecular Weight of Product) | 0.56(26,000) | 0.57(28,000) | 0.36(15,000) | 0.45(18,000) |
| Moles of Stearyl Alcohol Charged | 0.096 | 0.106 | 0.1698 | 0.138 |
| Mole Percent of Stearyl Alcohol Charged (Based on Moles of Diphenyl Isophthalate and Diphenyl Terephthalate Charged) | 2.0% | 2.2% | 3.54% | 2.87% |
| Stearyl Alcohol (Mole Percent based on Stearyl Alcohol Charged) in Phenolic Distillate: | | | | |
| Obtained during reaction of Stearyl Alcohol & Diphenyl Esters prior to addition of Bisphenol-A | — | 0.005% | 0.007% | 0.006% |
| Obtained during Polyester Prepolymer Preparation | 9.7% | 0.0% | 0.376% | 0.121% |
| Obtained during Final Polymerization Stage | 0.6% | 0.29% | 0.22% | 0.212% |
| Combined loss of Stearyl Alcohol as | | | | |

TABLE-continued

| | EXAMPLE 1 (Control) | EXAMPLE 2 | EXAMPLE 3 | EXAMPLE 4 |
|---|---|---|---|---|
| Unreacted Stearyl Alcohol in Phenolic Distillates (as Mole Percent Stearyl Alcohol based on Stearyl Alcohol Charged) | 10.3% | 0.3% | 0.6% | 0.34% |
| Duration of Heating (i.e. Residence Time) of Polymerization Mass at Maximum Polymerization Temperature, i.e. at about 290°–300°, in Final Polymerization Stage | 6.5 hours | 9 hours | 4 hours | 2 hours |
| As 1-octadecene obtained during reaction of Stearyl Alcohol and Diphenyl Isophthalate & Diphenyl Terephthalate prior to addition of Bisphenol | — | 0.01% | 0.22% | 0.005% |
| As 1-octadecene obtained during Polyester Prepolymer preparation | 0 | | | 0.025% |
| As 1-octadecene obtained during Final Polymerization Stage | 18.6% | 35.8% | 12.2% | 13.44% |
| Combined Loss of Stearyl Carboxylate Ester End Groups from Product as 1-ocedecene in Phenolic Distillates (as Mole Percent Stearyl Alcohol based on Stearyl Alcohol Charged) | 18.6% | 35.8% | 12.4% | 13.47% |
| Total Loss of Stearyl Carboxylate Ester End Groups from Product as Stearyl Alcohol and 1-octadecene in Phenolic Distillates (as Mole Percent Stearyl Alcohol based on Stearyl Alcohol charged) | 28.9% | 36.1%(18.9%)* | 13.0% | 73.8% |
| Mole Percent Conversion of Stearyl Alcohol charged to Stearyl Carboxylate Ester End Groups in Product | 71.1% | 63.9%(81.1%)* | 87.0% | 86.2% |
| Mole Percent Stearyl Carboxylate Ester End Groups in Product (based on Total End Groups in the Polyester) | 25% | 23.8%(30%)* | 29.3% | 29.3% |
| Weight Percent Stearyl Carboxylate Ester End Groups in Product (based on the Weight of the Polyester Product) | 1.18% | 1.16%(1.48%)* | 2.5% | 3.03% |

*NOTE: If the polymerization stage reaction mass in Example 2 had been reacted at the maximum polymerization temperature only as long as is the polymerization reaction mass in Example 1, so that the loss of stearyl ester end groups from the product group via 1-octadecene formation would be about the same in Examples 1 and 2, the loss of the stearyl carboxylate ester end groups in Example 2 would be about 18.9%; the percent conversion of Stearyl Alcohol to Stearyl Ester End Groups in Example 2 would be about 81.1%, the mole percent of stearyl carboxylate ester end groups in the product would be about 30%, and the weight percent stearyl carboxylate end groups in the product would be 1.48%, as is shown in the parenthesis.

From a comparison of the data of Examples 2 with the data of comparable Control Example 1 in the foregoing Table, the transesterification of the higher monofunctional aliphatic alcohol, i.e. stearyl alcohol, with the dicarboxylic acid diaryl ester reactants prior to commencement of the polymerization reaction involving the bisphenol reactant decrease the percentage loss of alcohol reactant overhead into the phenolic distillate from 10.3% to 0.3% i.e. by as much as 97%.

Although the total loss of stearyl alcohol charged is greater in Example 2 than in Control Example 1, the increased total loss in Example 2 is seen to be due to the longer heating (i.e. for 9 hours) of the reaction mixture in the final polymerization stage, i.e. heating at a temperature of about 290°–300°, in Example 2 as compared to heating prior (i.e. for 6.5 hours) in Example 1. This is so since the longer duration of heating of the polymerization mass at the aforementioned elevated temperature in Example 2 results in an increased loss (i.e. 35.8% of stearyl alcohol by pyrolysis to 1-octadecene of the stearyl carboxylate ester end groups, which are formed from the alcohol) as compared to the corresponding loss (i.e. 18.6%) of stearyl alcohol as 1-octadecene in Example 1. However, the extended heting period at the aforementioned elevated polymerization temperature in Example 2 results in a lower loss (i.e. 0.29%) of stearyl alcohol as unreacted stearyl alcohol compared to the corresponding loss (i.e. 0.6%) of unreacted stearyl alcohol in the polymerization stage of Example 1.

The invention has been described in the above specification and illustrated by reference to specific embodiments in the illustrative examples. However, it is to be understood that these embodiments are not intended to limit the invention since changes and modifications in the specific details disclosed hereinabove can be made without departing from the scope or spirit of the invention.

What is claimed is:

1. In the process of preparing a linear aromatic polyester by the transesterification polymerization reaction of a mixture of a bisphenol and a diaryl ester of a dicarboxylic acid wherein the molar proportion of the bisphenol and the diaryl ester ranges from about 5 molar percent insufficiency of the diaryl ester over the stoichiometric equivalent proportion of the bisphenol and the diaryl-ester to an excess of the diaryl ester over said stoichiometric proportion, the improvement wherein the diaryl ester is mixed with and transesterified with a minor molar proportion of a saturated aliphatic hydrocarbon monofunctional alcohol of 8 to 45 carbon atoms prior to any reaction of the bisphenol reactant and the diaryl ester reactant, said proportion of the alcohol being based on the molar amount of the diaryl ester reactant employed in the polymerization reactant.

2. The process of claim 1 wherein the transesterification reaction of the alcohol and the diaryl ester and the transesterification polymerization reaction are carried out in the presence of a catalytically effective amount of a transesterification catalyst.

3. The process of claim 2 wherein the catalyst employed in the transesterification reaction of the alcohol and the diaryl ester is the catalyst employed in the transesterification polymerization reaction and the transesterification reaction of said alcohol and said diaryl ester is carried out to substantial completion in the polymerization reaction mixture prior to the addition of the bisphenol to the mixture.

4. The process of claim 3 wherein the molar proportion of the alcohol is about 0.1 to about 25 mole percent based on the molar amount of the diaryl ester employed in the esterification, the reaction of the alcohol and the diaryl ester is carried out at a temperature of about 100° to about 300° and at atmospheric pressure or a pressure below atmospheric pressure.

5. The process of claim 4 wherein the molar proportion of the alcohol is above about 2.5 mole percent based on the molar amount of the diaryl ester, the reaction of the alcohol and the diaryl ester is carried out at a temperature of about 150° to about 250° and at sub-atmospheric pressure.

6. The process of claim 5 wherein the molar proportion of the alcohol is about 3.0 to about 10 mole percent based on the molar amount of the diaryl ester, the reaction of the alcohol and the diaryl ester is carried out at a temperature of about 175° to about 225°.

7. The process of claim 6 wherein the bisphenol and the diaryl ester are employed in about stoichiometric equivalent proportions and the amount of catalyst employed is about 0.005% to about 2% based on the combined weight of the bisphenol and diaryl ester.

8. The process of claim 7 wherein the proportion of catalyst employed is about 0.01% to about 1% based on the combined weight of the bisphenol and the diaryl ester.

9. The process of claim 8 wherein the catalyst is lithium phenoxide.

10. The process of claim 1 wherein the diaryl ester is the diester of an aromatic monohydroxy compound of the benzene or naphthalene series of 6 to 20 carbon atoms and a dicarboxylic acid of the formula:

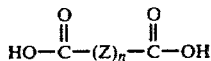

wherein Z is alkylene, —Ar— or —Ar—Y—Ar— where Ar is aromatic, Y is alkylene, haloalkylene,

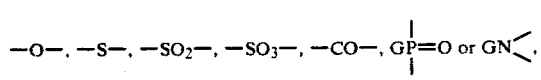

wherein G is alkyl, haloalkyl, aryl, haloaryl, alkylaryl, haloalkylaryl, arylalkyl, haloarylalkyl, cycloalkyl or cyclohaloalkyl; and n is 0 or 1 and the alcohol is a saturated alcohol of 9 to 40 carbon atoms.

11. The process of claim 10 wherein said diaryl ester is the diester of an aromatic monohydroxy compound of the benzene series and an aromatic dicarboxylic acid and the alcohol is an acyclic alcohol of 12 to 30 carbon atoms.

12. The process of claim 11 wherein the diaryl ester is a diester of phenol and an aromatic dicarboxylic acid selected from the group consisting of isophthalic acid, terephthalic acid and mixtures thereof, the alcohol is a straight chain primary alcohol of 15 to 20 carbon atoms.

13. The process of claim 12 wherein the diaryl ester is the diphenyl ester of a mixture of about 75 to 100 mole percent of isophthalic acid and about 25 to 0 mole percent of terephthalic acid.

14. The process of claim 13 wherein the diaryl ester is the diphenyl ester of a mixture of about 75 to about 90 mole percent isophthalic acid and about 10 to about 25 mole percent terephthalic acid and the alcohol is stearyl alcohol.

15. The process of claim 1 wherein the bisphenol has the formula:

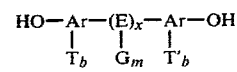

wherein Ar is aromatic, G is alkyl, haloalkyl, aryl, haloaryl, alkylaryl, haloalkylaryl, arylalkyl, haloarylalkyl, cycloalkyl, or cyclohaloalkyl; E is divalent alkylene, haloalkylene, cycloalkylene, halocycloalkylene, arylene, or haloarylene, —O—, —S—,

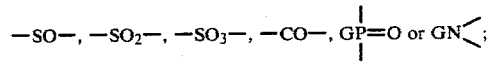

T and T' are independently selected from the group consisting of halogen, G and OG; m is an integer from 0 to the number of replaceable hydrogen atoms on E; b is an integer from 0 to the number of replaceable hydrogen atoms on Ar, and x is 0 or 1.

16. The process of claim 15 wherein the bisphenol is bisphenol-A.

17. In the process of preparing a linear aromatic polyester by the transesterification polymerization reaction of a mixture of about stoichiometric equivalent proportions of a bisphenol and a diphenyl ester of an aromatic dicarboxylic acid, the improvement wherein the diphenyl ester is transesterified at a temperature of about 100° to 300° under sub-atmospheric pressure with about 0.1 mole percent to about 25 mole percent of an aliphatic monofunctional saturated alcohol of 9 to 40 carbon atoms, based on the molar amount of the diphenyl ester reactant, prior to the addition of the bisphenol to said mixture, said transesterification reaction of the alcohol and the diphenyl ester and said transesterification polymerization reaction being carried out in the presence of about 0.005% to about 2% of a transesterification catalyst based on the combined weight of the bisphenol and the diphenyl ester to recover a linear aromatic polyester of said bisphenol and said dicarboxylic acid which contains at least about 5 mole percent of a terminal carboxylate ester group derived from the organic radical of said alcohol based on the total moles of end groups in the polyester.

* * * * *